Nov. 29, 1927.

C. BOUIN

RIVAL PHOTOGRAPHS

Filed Jan. 26, 1922

1,651,248

Inventor
C. Bouin.
Mahoney & Mahoney
Attorneys.

Patented Nov. 29, 1927.

1,651,248

UNITED STATES PATENT OFFICE.

CHARLES BOUIN, OF BOSTON, MASSACHUSETTS.

RIVAL PHOTOGRAPH.

Application filed January 26, 1922. Serial No. 531,940.

This invention involves the art of photographing two similar, dissimilar or entirely different pictures in a superimposed position upon a light sensitive material or base to be explained, and such a combination constitutes an improvement.

The invention relates more particularly to a base, material or substance upon which the pictures are photographed or printed, and upon the results obtained in viewing the two pictures on material or base to be described.

Objects and advantages of the present invention will be pointed out in the hereinafter following description of one embodiment hereof, or will be obvious to those skilled in the arts.

The object of this invention is to provide a ways and means and also a suitable material of certain construction whereby two different pictures or photographs are impressed, printed or photographed upon said material of certain specified construction in such a manner that upon viewing such photographed images of scenes or objects upon such material of certain specified construction, at certain angle directions and distances such photographed images of scenes or objects will be observed in such a manner that by means of rivalry of colors, only one picture will be observed at one time and this one picture or photograph gradually fading or becoming unseen as the second picture or photograph becomes observed, or if desired, only certain sections of photographs becoming alternately observed and unobserved. Each of such two photographs may be much alike or completely different, as desired; the two different pictures being printed or photographed upon such a constructed material or base as to be specified, in such a manner that when viewed at certain angle directions, only the view on the left side of triangular bodies will be observed by the left eye, and only the view on the right side of triangular bodies will be observed by the right eye, and in viewing such a combination of two different photographs only one picture will be perceived at the same time, due to the law of "rivalry of colors" in vision, for the reason that the two different photographs are colored, toned, dyed or mordanted different primary colors, for example; one picture being blue and the other picture being green. When a less degree of rivalry is desired it may be accomplished by a selection of two colors of less degrees of intensity.

Figure 1:
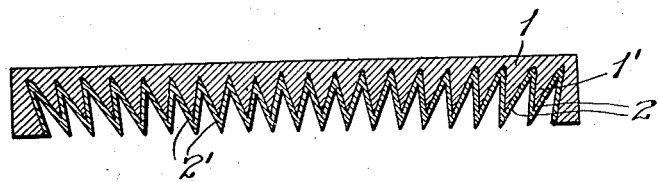
Figure 1 is an enlarged sectional view taken through a photograph constructed according to the present invention and showing the tapering projections on its exposed face and the vari-colored coating on the sides of the projections—

Referring to the drawing, 1 represents the base of any suitable substance having a coating of bichromated gelatin, or the like thereon bearing two dissimilar pictures in two unlike or contrasting colors.

The base 1 has projecting from its exposed face a plurality of vertical tapering bodies or bars 1'. The bodies 1' at the middle or center of the base 1 being substantially equilateral, while the bodies 1' at the sides of the base 1 have their faces inclined toward the center, the angle of inclination of the side bodies 1' changing progressively from the edge of the photograph base 1 to the center.

Figure 2:
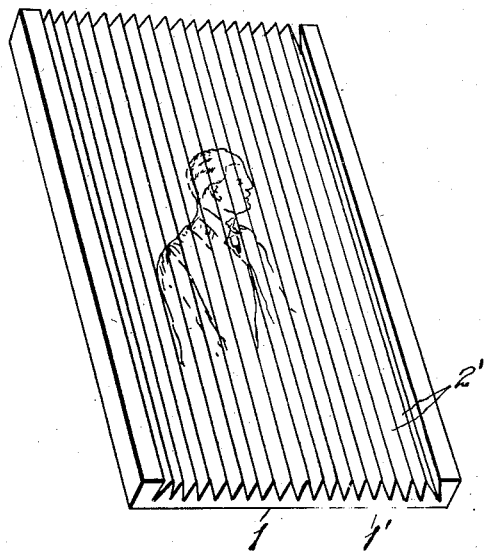
Figure 2 is a fragmentary perspective view of the photograph, enlarged, looking thereat from the left.
Figure 3:
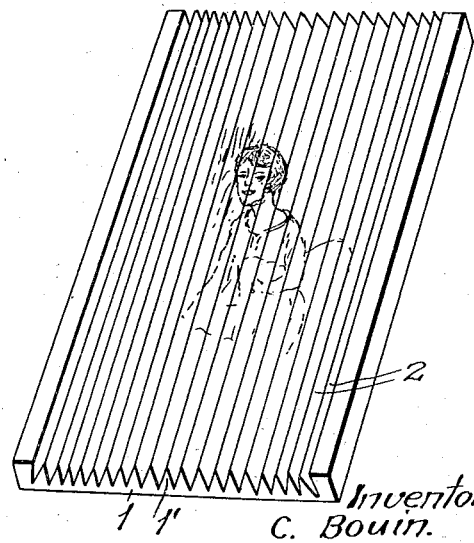
Figure 3 is a like view looking at the same from the right.

The tapering bodies have their right and left faces coated, as at 2 and 2', and the coating 2 on one side is of a color, such as green, different from the color, such as red, of the coating 2', and further, the coating 2 has imprinted thereon a picture which is dissimilar to a picture which is imprinted on the coating 2' as shown in Figures 2 and 3.

The two dissimilar pictures, one on the left side and one on the right side of the tapering bodies, are thus toned or dyed a different color, such as; one being toned red and the other being toned green, or any two different colors may be used provided such two colors used are capable of causing retinal rivalry of color when separately presented, to each eye.

In one method of making the photograph, exposure is made on one side only at a time of the angles. After the first exposure on one side of the varying angles, toning is done in the usual way and then washed, after which the second exposure on the opposite side is made and toned a different color.

In another method, exposure is made on both sides of the varying angles at the same time, but instead of two negatives, one negative and one positive are used, being exposed at the same time. The exposure is made on the faces of varying angles having bichromated gelatin on their surface. In such an exposure, the light affected bichromated gelatin emulsion will be stained or colored by a solution of a certain class of dyes and if red is used the image of the negative projected on the right side of the tapering bodies 1' will be red in the "high lights" or light affected portions of the gelatin coating while the image from the positive on the left side will also be colored red in the "high lights." (The high lights of a negative being the low lights of a positive.) After coloring with the above mentioned class of dyes the colored images are thoroughly washed and afterward given a second bath of a solution of dye (green) which colors only that portion of the bichromated gelatin coating which has not been acted on by the light; thus giving us on one side of the bodies 1' a red image with green background or shadows and on the opposite side of the tapering bodies a green image with red background or shadows.

Such images, when presented one to each eye at the same time will cause rivalry of pictures, as previously explained.

There are various other ways in which the two different images may be given different or rival colors and the above two mentioned methods are given merely as an example.

Having thus described my invention, I claim:—

1. A rival photograph comprising a base having tapering bodies projecting therefrom, the sides of the bodies in the center of the base being substantially equilateral, the bodies at the sides of the base having their faces inclined toward the center, the angle of inclination changing progressively from the edge of the photograph to the center, said tapering bodies having printed on their left hand faces an image of one color and printed on their right hand faces a dissimilar image of a different color.

2. A rival photograph comprising a base having vertically disposed tapering bodies projecting from the face thereof, the sides of the bodies at the intermediate portion of the base being substantially equilateral and the bodies at the opposite sides of the equilateral bodies having their axes inclining toward and proportionately to the distance from the intermediate tapering bodies, the angle of inclination changing progressively to expose an image of a scene in one color on the left sides of the tapering bodies to the lines of vision of the left eye and to expose an image different in scene and color than the first mentioned on the right sides of the tapering bodies to the lines of vision of the right eye.

This specification signed this 20th day of January, 1922.

CHARLES BOUIN.